(12) United States Patent
Fidaleo

(10) Patent No.: US 11,734,941 B2
(45) Date of Patent: *Aug. 22, 2023

(54) VARIABLE RESOLUTION RECOGNITION

(71) Applicant: Disney Enterprises, Inc., Burbank, CA (US)

(72) Inventor: Douglas Fidaleo, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 310 days.

This patent is subject to a terminal disclaimer.

(21) Appl. No.: 17/039,704

(22) Filed: Sep. 30, 2020

(65) Prior Publication Data

US 2021/0019509 A1 Jan. 21, 2021

Related U.S. Application Data

(63) Continuation of application No. 15/890,258, filed on Feb. 6, 2018, now Pat. No. 10,832,043.

(51) Int. Cl.
*G06V 40/10* (2022.01)
*G06F 16/90* (2019.01)
*G06T 7/73* (2017.01)
*G06V 30/24* (2022.01)
*G06V 40/16* (2022.01)
*G06V 20/52* (2022.01)

(52) U.S. Cl.
CPC ........... *G06V 40/103* (2022.01); *G06F 16/90* (2019.01); *G06T 7/73* (2017.01); *G06V 30/248* (2022.01); *G06V 40/16* (2022.01); *G06V 40/172* (2022.01)

(58) Field of Classification Search
CPC ........... G06K 9/00369; G06K 9/00288; G06K 9/685; G06K 9/00221; G06F 16/90; G06T 7/73
See application file for complete search history.

(56) References Cited

U.S. PATENT DOCUMENTS

| 6,028,626 | A | * | 2/2000 | Aviv | G08B 13/19602 |
| | | | | | 382/118 |
| 10,410,086 | B2 | * | 9/2019 | Bapat | G06F 18/23 |
| 10,599,950 | B2 | * | 3/2020 | Bapat | G06V 40/10 |
| 10,936,876 | B2 | * | 3/2021 | Wang | H04N 7/18 |
| 11,321,554 | B2 | * | 5/2022 | Edelen | G06F 16/5854 |
| 2005/0078184 | A1 | | 4/2005 | Sakai et al. | |

(Continued)

OTHER PUBLICATIONS

European Search Report in EP Application No. 19155690.1, dated Jan. 28, 2020.

(Continued)

*Primary Examiner* — Bobbak Safaipour
(74) *Attorney, Agent, or Firm* — Sheppard Mullin Richter & Hampton LLP

(57) ABSTRACT

Systems and methods are described for dynamically adjusting an amount of retrieved recognition data based on the needs of a show, experience, or other event where participants are recognized. The retrieved recognition data may be deleted once it is no longer needed for the event. Recognition data retrieval is limited to just what is needed for the particular task, minimizing the uniqueness of any retrieved recognition data to respect participant privacy while providing an enhanced participant experience through recognition.

20 Claims, 10 Drawing Sheets

(56) References Cited

U.S. PATENT DOCUMENTS

| | | | |
|---|---|---|---|
| 2009/0141138 A1* | 6/2009 | DeAngelis | H04N 7/181 |
| | | | 348/231.5 |
| 2010/0066822 A1* | 3/2010 | Steinberg | G06V 40/173 |
| | | | 382/118 |
| 2015/0269731 A1* | 9/2015 | Liu | G06V 30/2504 |
| | | | 382/103 |
| 2015/0288926 A1* | 10/2015 | Glass | H04N 7/152 |
| | | | 348/14.09 |
| 2016/0227228 A1* | 8/2016 | Pomeroy | H04N 5/772 |
| 2018/0150956 A1* | 5/2018 | Kao | G06T 7/11 |
| 2018/0167634 A1* | 6/2018 | Salmimaa | H04N 19/167 |
| 2018/0343390 A1* | 11/2018 | Duran | H04N 23/71 |
| 2019/0005790 A1* | 1/2019 | Troughton | G06V 10/95 |
| 2019/0051127 A1* | 2/2019 | Kanga | G08B 13/19604 |
| 2019/0303685 A1* | 10/2019 | Nagao | G08B 21/182 |
| 2019/0354768 A1* | 11/2019 | Wang | H04N 7/18 |
| 2019/0354769 A1 | 11/2019 | Wang | |
| 2020/0226361 A1* | 7/2020 | Murray | G06V 20/52 |
| 2020/0410226 A1* | 12/2020 | Roth | G06V 20/52 |
| 2022/0245224 A1* | 8/2022 | Rojas | G06V 40/1365 |

OTHER PUBLICATIONS

First Examination Report in EP Patent Application No. 19155690.1, dated Nov. 16, 2021.

Prosser, Bryan James, "Person Re-Identification Over Distributed Spaces and Time," Queen Mary University of London, Jan. 1, 2012, retrieved online on Jan. 28, 2020, at <https://pdfs.semanticscholar.org/0b20/4afe26f1a73e9183c575e99fe37fef8c1500.pdf>.

Safaei, Farzad et al., "Large-scale immersive video conferencing by altering video quality and distribution based on the virtual context," IEEE Communications Magazine 52.8 (2014): 66-72, 2014.

\* cited by examiner

| RECOGNITION DATA POLICY LEVEL | RECOGNITION DATA RETRIEVED | RECOGNITION DEVICE CONFIGURATION | SECURITY CONFIGURATION |
|---|---|---|---|
| 1 | Clothing data, hairstyle, accessories, No facial points or body scanning | 720P or lower video | Secured LAN or WAN Storage |
| 2 | Limited number of facial points | 1080P video | Data Encryption<br>Secured LAN storage only<br>Delete data at end of day |
| 3 | High number of facial points, full body scan | above 1080P video, infrared camera scan | Data Encryption<br>Local sensor assembly storage only<br>Delete data before end of day |

FIG. 3

910
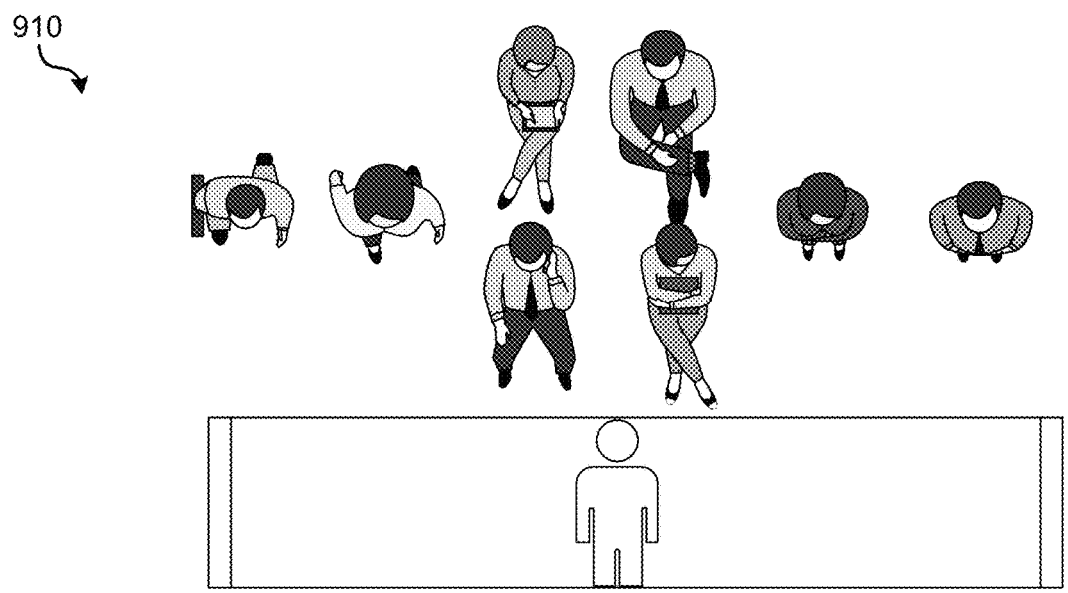
920
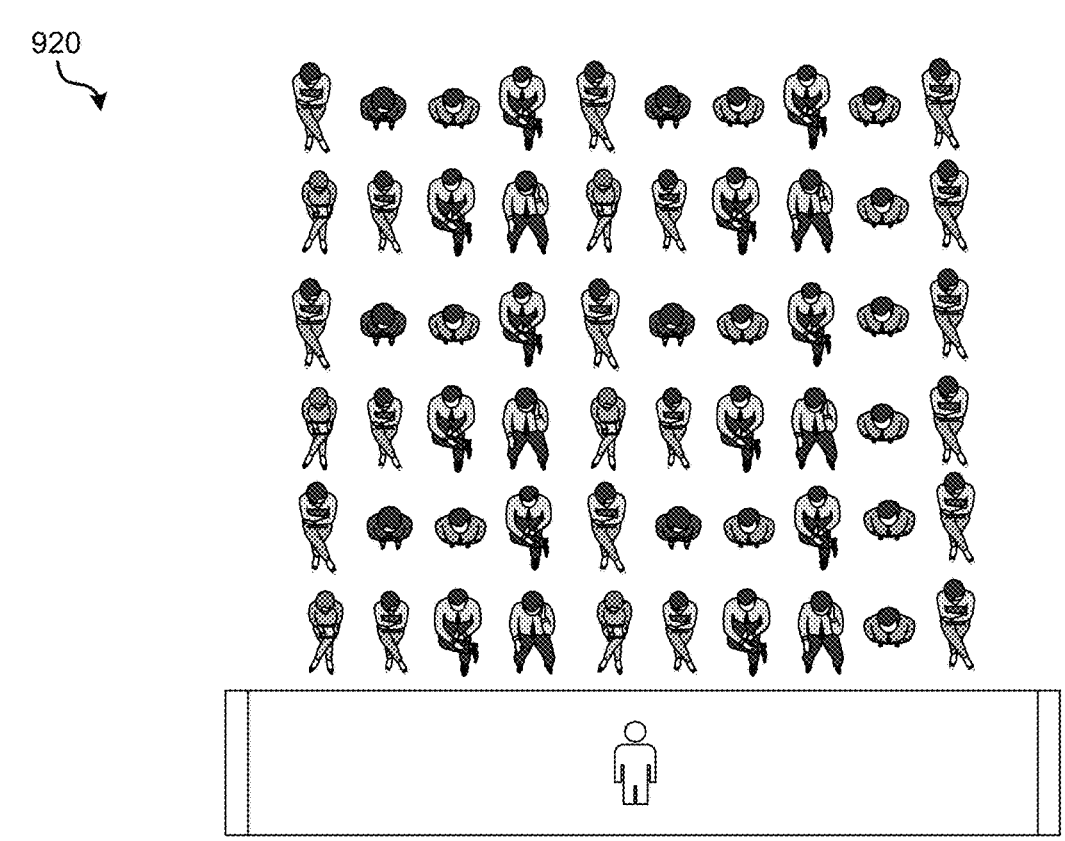
FIG. 9

VARIABLE RESOLUTION RECOGNITION

CROSS-REFERENCE TO RELATED APPLICATIONS

The present application is a continuation of U.S. patent application Ser. No. 15/890,258 filed on Feb. 6, 2018 and titled "VARIABLE RESOLUTION RECOGNITION," which is incorporated herein by reference in its entirety.

BRIEF SUMMARY OF THE DISCLOSURE

In one embodiment, a system includes: a recognition assembly comprising a sensor; and one or more non-transitory computer-readable mediums having instructions stored thereon that, when executed by one or more processors, cause the system to: analyze characteristics of participants of an event to determine an amount of recognition data needed to recognize participants of the event; assign a recognition data policy to the recognition assembly based on the determined amount of recognition data needed to recognize participants of the event; and after assigning the recognition data policy, recognizing participants at the event using at least the sensor. In this embodiment, the assigned policy may control an amount of recognition data retrieved by the recognition assembly. In implementations, the analyzed characteristics of participants comprise a number of participants and a similarity of features between participants.

In some implementations, the system may further include: a temporary recognition database, and the instructions when executed by the one or more processors, may further cause the system to: retrieve, based on the assigned recognition data policy, recognition data from data captured by the sensor; and store the retrieved recognition data in the temporary recognition database.

In some implementations, the instructions when executed by the one or more processors, further cause the system to: delete the stored recognition data at a predetermined time based on the event.

In some implementations, the assigned recognition data policy is assigned from a set of a plurality of recognition data policies, where each of the plurality of recognition data policies controls an amount of recognition data retrieved by the recognition assembly, and where the recognition data policy is assigned to minimize an amount of retrieved recognition data while recognizing participants with a threshold accuracy. In particular implementations, each of the recognition data policies sets a respective number of facial points of a participant that are acquired from an image captured by the sensor. Alternatively, each of the recognition data policies may set a respective number of facial points of a participant that are scanned by a 3D infrared sensor.

In some implementations, each of the plurality of recognition data policies may set sensor device acquisition settings of the recognition assembly, security settings that are applied to retrieved recognition data, or some combination thereof.

In some implementations, the instructions when executed by the one or more processors, further cause the system to: create the plurality of recognition data policies, where creating the plurality of recognition data policies includes: determining first recognition data retrieval settings for a first level recognition data policy associated with the event; creating the first level recognition data policy based on the determined first recognition data retrieval settings; determining second recognition data retrieval settings for a second level recognition data policy associated with the event, where the second recognition data retrieval settings are determined using the first level recognition data policy as a starting point; and creating the second level recognition data policy based on the determined second recognition data retrieval settings.

In some implementations, the stored recognition data is stored as a plurality of templates, and the instructions when executed by the one or more processors, further cause the system to: retrieve, based on the assigned recognition data policy, second recognition data from an image captured by the sensor; and compare the second recognition data with each of the plurality of templates to recognize a participant.

In some implementations, the sensor may be an image sensor that captures images.

In one embodiment, a recognition assembly includes: an image sensor device to acquire image sensor data of one or more participants at an event; a recognition data processor to acquire recognition data from the image sensor data based on an assigned recognition data policy, where the policy controls an amount of recognition data retrieved by the recognition data processor to minimize an amount of retrieved recognition data while recognizing participants with a threshold accuracy; and a temporary recognition database for storing the acquired recognition data, where the temporary recognition database is to delete the stored data after a predetermined amount of time based on the assigned recognition data policy.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

FIG. 3 is a table illustrating three example levels of recognition data policies that may be implemented in a particular implementation.

FIG. 9 illustrates examples show settings and in which different levels of recognition data may be retrieved for the purpose of recognizing audience members during the duration of the show.

Figure 1:
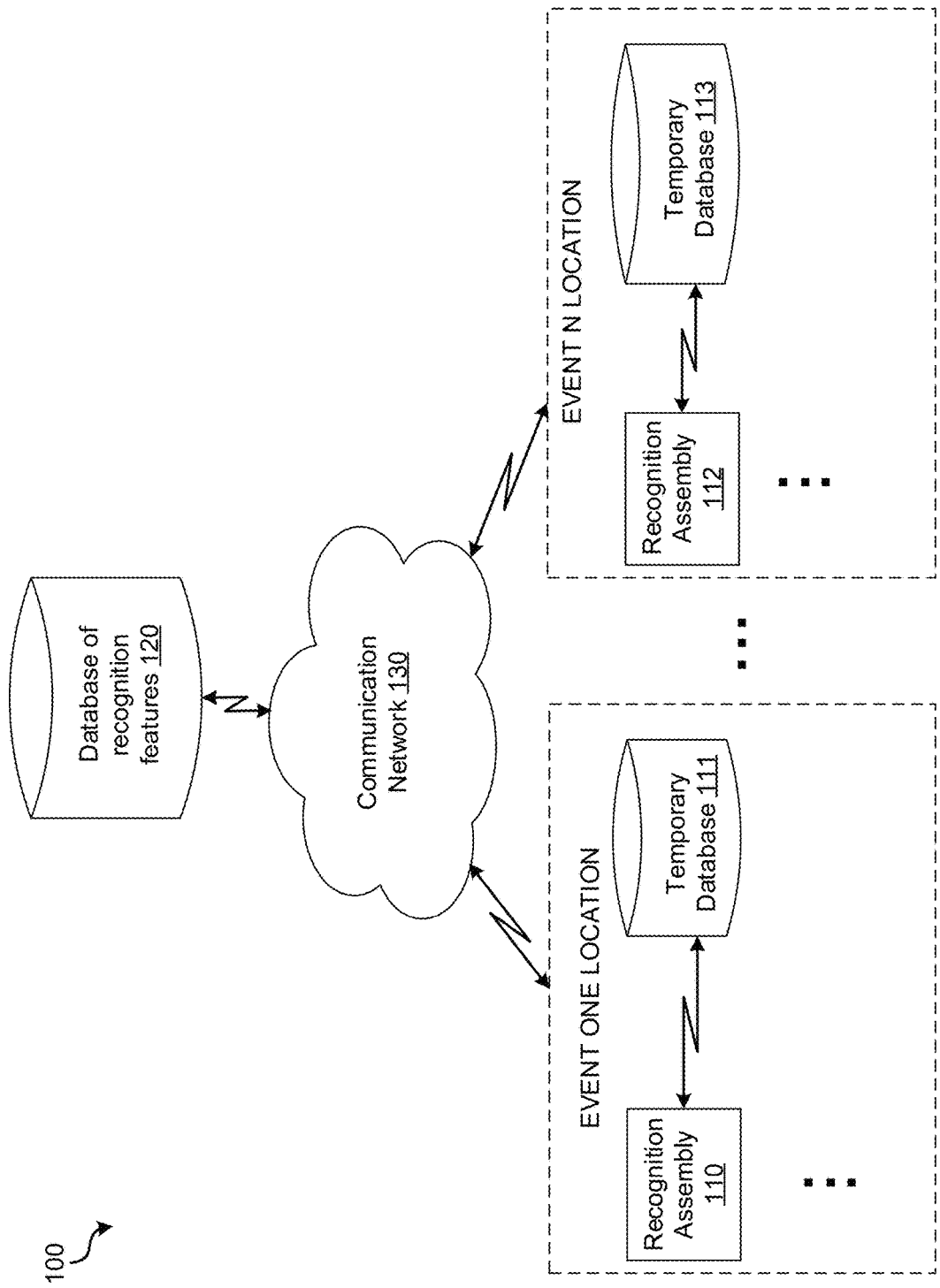
FIG. 1 illustrates an example environment in which the disclosure may be implemented.

The figures are not exhaustive and do not limit the disclosure to the precise form disclosed.

DETAILED DESCRIPTION

As used herein, the term "recognition data" generally refers to data representative of features of a person that may be used to recognize that person over a period of time. Recognition data may include hard recognition data and/or soft recognition data. For example, hard recognition data may include data relating to the user's fingerprint, speech, and face, and soft recognition data may include data relating to the user's clothing, hairstyle, and accessories.

Current biometric systems assume a large universe of people and extract the most unique identifiers possible (where uniqueness is defined relative to the entire universe of subjects). For example, many current biometric systems are focused on extracting the user's full fingerprints and/or conducting a detailed facial scan (e.g., by extracting thousands of fiducial points by projecting an infrared dot pattern on the user's face). The more unique a biometric identification is, the greater the risk associated with unauthorized usage of the user's unique data. For example, hard recognition data generally cannot be changed. Once hard recognition data has been compromised, it may no longer be useful for authentication purposes. Additionally, for many users, the acquisition of unique recognition data (e.g., full finger print or detailed facial scan) can be perceived as a violation of the user's personal sense of privacy.

In many cases, however, it is not necessary for biometric systems to assume a large universe of subjects. For example, in a restaurant setting, the recognition data needed to distinguish a handful of diners at a table may require nothing more than recognizing differences in clothing color and gender. As another example, in an entertainment venue, trade show or conference, where participants attend multiple discrete events, it may only be necessary to recognize participant features for a limited set of participants over a limited interval of time and space for each discrete event. For instance, in order to recognize participants participating in a product demonstration event that lasts only a few minutes (e.g., for the purpose of providing the participants an opportunity to purchase photographs or audio recordings taken during the event), it may only be necessary to retrieve enough recognition data to distinguish between each of the different participants viewing the demonstration rather than considering all participants within a convention center in which the demonstration took place.

To this end, embodiments of the disclosure are directed to systems and methods for dynamically adjusting the amount, resolution, or accuracy of retrieved recognition data based on the needs of a show, experience, or other event where the participants are recognized. Additionally, the retrieved recognition data may be deleted after a predetermined amount of time passes (e.g., once it is not needed for the event). By implementing the techniques described herein, recognition data retrieval is limited to just what is needed for the particular task, thereby minimizing the uniqueness of any retrieved recognition data to respect participants' privacy while providing an enhanced participant experiences through participant recognition.

In addition to preserving the participant's privacy, embodiments of the disclosure can provide the additional benefits of improving hardware costs, computational efficiency, and information storage. By limiting recognition data retrieval to, for example, recognition of soft recognition data such as clothing, accessories, and hair color in instances where only a small number of participants need to be distinguished, the amount of raw sensor data that needs to be captured, processed, and stored may be substantially reduced. For example, a basic high definition camera (e.g., 720P or 1080P resolution camera) may be used in place of an ultra-high definition camera (e.g., 4K or 8K resolution camera) in settings that only require recognition of a small number of participants. As another example, the resolution and frame rate of a ultra-high definition camera may be dynamically adjusted depending on the number of participants present during a time period. For example, the ultra-high definition camera may be configured to run in a low resolution/low frame rate mode except during periods of high participant numbers.

In accordance with embodiments described herein, recognition data retrieval may be configured at a recognition assembly (e.g., image sensor assembly including devices such as an RGB camera, infrared camera, etc.) by utilizing different recognition data policy levels, where a lowest policy level specifies the lowest level of recognition data retrieval and the highest policy level specifies the highest level of recognition data retrieval. In accordance with these embodiments, a recognition assembly may be configured to always utilize the lowest policy level needed to recognize and distinguish between participants over a particular space and time.

FIG. 1 illustrates an example environment 100 in which the disclosure may be implemented. Environment 100 includes multiple event locations, each event location including one or more recognition assemblies 110, 112 that may be used to recognize participants. By way of example, environment 100 may be an amusement park, a fairground, a convention, a conference, or other location where events take place. The events may include, for example, an amusement park ride or fairground ride (e.g., a roller coaster, water ride, Ferris wheel, swing ride, etc.) a show or presentation (e.g., in an auditorium or outdoors), a restaurant, a booth, etc. Although described in the context of a multi-event environment, embodiments described herein may also be implemented in single-event environments (e.g., restaurants).

At each event, one or more recognition assemblies (e.g., 110, 112) recognize participants over a time period to enhance the event experience. For example, participants may be recognized for the purpose of checking in participants at events to avoid long lines, providing the participants with personalized offers, offering personalized experiences to the participants (e.g., speaking to the participants on a first-name basis at restaurants; customizing a virtual reality experience presented to a participant using a head mounted display, etc.), providing personalized information to the participants, and for other purposes. Additionally, in example environment 100, participants may be recognized across multiple events by communicating recognition information over communication network 130.

Recognition assemblies 110, 112 include any recognition assembly that is configured to use one or more sensors to generate electrical signals that may be digitally encoded to retrieve recognition information of participants. For example, the recognition assemblies may utilize sensors that include image sensors (e.g., still or video cameras, infrared cameras, fingerprint scanners, 3D cameras, etc.), temperature sensors, audio sensors, pressure sensors, accelerometers, magnetometers, or some combination thereof. Embodiments described herein will be described primarily in the context of recognition assemblies that extract recognition data using recognition devices that utilize image sensors, but it will be appreciated from the disclosure that the systems and methods described herein may be implemented using other types of recognition assemblies.

Each recognition assembly is configured such that the amount of recognition data that is retrieved is limited to the needs of the event. In addition, recognition data retrieval may be limited such that any retrieved recognition data is deleted after a predetermined amount of time has passed (e.g., after it is no longer needed for the event). For example, recognition data may be stored in a local volatile storage that purges stored recognition data after a predetermined amount time has passed.

For each event location, the recognition data retrieved by each recognition assembly may be stored as templates in local and temporary database 111, 113. The templates may be used to recognize participants for a limited period of time and are deleted after they are no longer needed. The use of a local and temporary recognition database in this implementation secures any acquired data and ensures that it is only utilized as needed to recognize participants for the event. In some instances, the databases 111, 113 may be directly incorporated into their respective recognition assemblies (e.g., as an internal storage element).

By way of example, consider the example where recognition data is retrieved for the purpose of recognizing participants who rode an amusement park ride to subsequently distribute photographs to participants of the ride. In this example, any recognition data acquired during the ride may be stored in a temporary recognition database and deleted after about 20 minutes (e.g., maximum amount of time before typical participant moves on to next ride) and it may be retrieved such that it can uniquely distinguish between about 200 participants (e.g., typical number of participants that pass through the ride in an hour) with sufficient accuracy.

Also illustrated in the example of FIG. 1 is a database of recognition features 120 that maintains statistics or other information regarding unique features that are not part of the current population. In various implementations, database 120 may be leveraged to ensure that the recognition data obtained from attending participants remains ambiguous when considering a larger population of individuals. For example, the database may maintain anonymous statistics regarding facial feature points for a larger number of individuals (e.g., thousands or greater), not part of the participant population, that may be used to evaluate how unique a set of facial feature points are. For example, the database may maintain statistics regarding the number and/or location of facial feature points in a two-dimensional image or three-dimensional point scan required to match one participant among 10, 100, 1000, or any other number of participants with a threshold accuracy (e.g. 95% accuracy, 99% accuracy, etc.).

Recognition assemblies in each event location may retrieve information from database 120 over communication network 130. Communication network 130 may comprise any communication network suitable for exchanging data between database 120 and recognition assemblies 110, 112. It may include a combination of local area networks and a wide area network. Some non-limiting examples of mediums that may be used to communication over network 130 include: wired communication mediums, such as cable, fiber-optic, or DSL; or wireless communication mediums such as WiFi, cellular communications, or satellite communications.

In implementations where participants may be recognized throughout different events in environment 100 (e.g., in the case of an amusement park or fairground), recognition assemblies or other devices from different event locations may communicate with each other over communication network 130. For example, information such as participant flow information (e.g., a current number of participants passing through each event per unit of time) may be shared such that the recognition assemblies 110 dynamically adjust (e.g., increase/decrease) the amount of recognition data that is retrieved as participant numbers increase or decrease.

Figure 2:
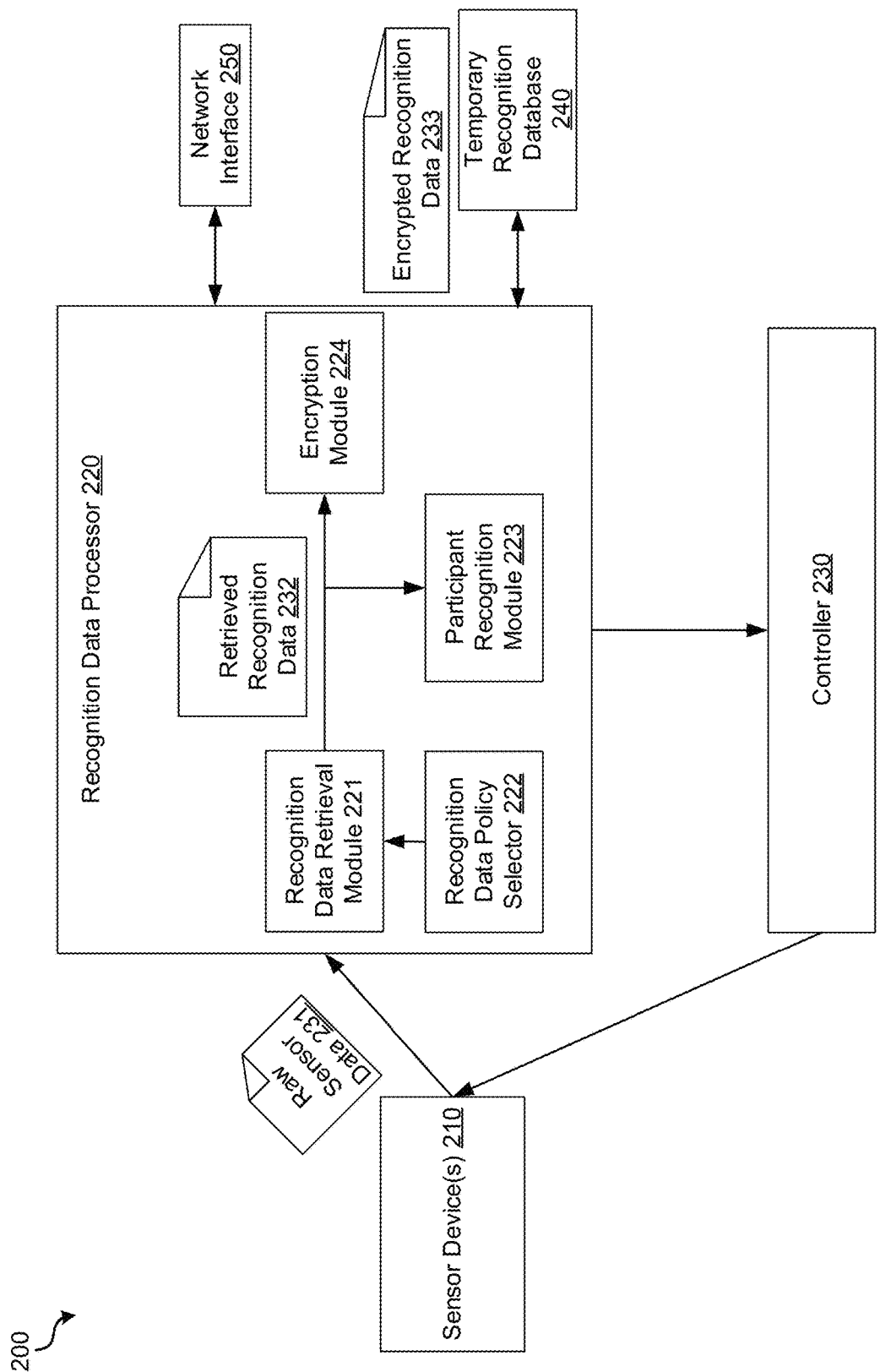
FIG. 2 is a block diagram illustrating an example architecture for a recognition assembly in accordance with embodiments.

FIG. 2 is a block diagram illustrating an example architecture for a recognition assembly 200 in accordance with embodiments. As illustrated, assembly 200 includes one or more sensor devices 210, a recognition data processor 220, a controller 230, a temporary recognition database 240, and a network interface 250.

Sensors devices 210 may include devices such as a camera, an infrared camera, a fingerprint reader, a temperature sensor, and other devices that return raw sensor data 231. For example, a video or still image camera may capture images of participants participating in an event.

In the example of FIG. 2, the operation of sensor devices 210 is controlled by a controller 230, which may send one or more control signals that configure the sensor devices to capture data based on the amount of recognition data that is needed to recognize participants for the purpose of the event. The transmitted control signals may be based on a recognition data policy selected or assigned by recognition data policy selector 222, further described below.

For example, the control signals may disable/enable sensors and/or reduce/increase the fidelity or accuracy of the captured sensor data depending on the amount of recognition data needed to distinguish between participants. By way of example, consider the case where sensor devices 210 include a three-dimensional infrared camera that scans a configurable number of facial points of a participant. During operation, the infrared camera may be dynamically configured to scan just enough facial points to distinguish between the number of participants passing through the event with an acceptable confidence. As participant flow increases, the number of scanned facial points may increase, and as participant flow decreases, the number of scanned facial points may decrease.

As another example, consider the case where sensor devices 210 include a two-dimensional camera (e.g., an infrared night camera that uses an IR spotlight or an RGB camera) that captures images of participants. During operation, the resolution of the camera may be dynamically adjusted (e.g., between 480P, 720P, 1080P, etc.) such that the resolution is just good enough to recognize participants passing through the event with an acceptable confidence.

Network interface 250 may comprise a network interface controller or other suitable device for communicating with other recognition assemblies or other devices over a communications network. For example, network interface 250 may be used to receive and/or transmit non-unique recognition data, receive statistics from a database 120, etc.

Recognition data processor 220 includes a recognition data retrieval module 221, a recognition data policy selector 222, a participant recognition module 223 and an encryption module 224.

In this example, recognition data retrieval module 221 retrieves recognition data 232 from sensor data 231 using a recognition data policy selected by selector 222, where a policy controls the amount of retrieved recognition data and any security settings that may be applied to the retrieved recognition data.

Encryption module 224 encrypts retrieved recognition data that is stored in temporary recognition database 240 or decrypts encrypted recognition data that is retrieved from temporary recognition database 240 (e.g., for the purpose of recognizing participants through a template match). 128-bit or 256-bit AES encryption, triple DES encryption, or other suitable encryption algorithms may be utilized. In implementations, the level of encryption that is applied may be configured (e.g., by using a recognition data policy) based on the uniqueness of any recognition data that is retrieved. In some implementations, the recognition assembly may forego data encryption if the retrieved recognition data has minimal uniqueness (e.g., can only distinguish between a handful of individuals).

Temporary recognition database 240 temporarily stores recognition data (e.g. encrypted recognition data 233) to recognize participants. In implementations, temporary recognition database 240 may be configured to delete all stored recognition data at a certain time (e.g., at the end of an event). In some implementations, recognition database 240 may record the time recognition data is stored, and delete that data after a predetermined amount of time passes. Temporary recognition database 240 may be secured by making it only locally accessible (e.g., accessible only to a user in the same physical location as assembly 200). In some implementations, assembly 200 may also include a longer-term storage (not shown) for soft recognition data of minimally unique participant features to recognize the participants for longer periods of time.

Referring again to recognition data policy selector 222, a selected recognition data policy may specify the settings of sensor devices retrieving the recognition data (e.g., image resolution settings of camera and/or sensors that are enabled/disabled), the way the retrieved recognition data is processed by recognition data retrieval module 221 (e.g., amount of recognition data that is retrieved from the sensor data), the way the retrieved recognition data is encrypted, the way the retrieved recognition data is stored (e.g., only local storage for hard recognition data versus remote storage for soft recognition data), and/or the duration of time the retrieved recognition data is stored before it is deleted.

The recognition data policies may be hierarchically implemented as a set of policy levels, where a lowest policy level specifies the lowest level of recognition data retrieval and the highest policy level specifies the highest level of recognition data retrieval. FIG. 3 is a table illustrating three example levels of recognition data policies that may be implemented in a particular implementation. In the example of FIG. 3, each recognition data policy specifies: the amount and type of recognition data that is retrieved from sensor data, the configuration of the sensor devices (e.g., camera settings), and the security settings for the retrieved recognition data. At the lowest level (1), only soft recognition data (clothing data, hairstyle data, accessories data) is retrieved and the camera is configured to capture lower resolution video (720P or lower) of participants. For the lowest policy level, the retrieved soft recognition data (least unique features of participants) may be serialized for longer term storage. At the middle level (2), a small number of facial points (e.g., 5, 10, 15, etc.) may be retrieved from images captured by the camera and the captured video resolution may be higher (1080P). Additionally, the security configuration of the policy specifies that the data is to be deleted by the end of the day and stored only in a LAN. At the highest level (3), a high number of facial points (e.g., 100 or greater) are retrieved from images captured by the camera. In this example, the camera may be configured to capture video at above a 1080P resolution (e.g., 2K, 4K, or 8K resolution). Additionally, in this example, an additional device is enabled (infrared camera) for scanning a participant's body. Although three levels of recognition data policies are illustrated in the example of FIG. 3, it will be appreciated from the description that any number of recognition data policies may be implemented at a recognition assembly.

Figure 4:
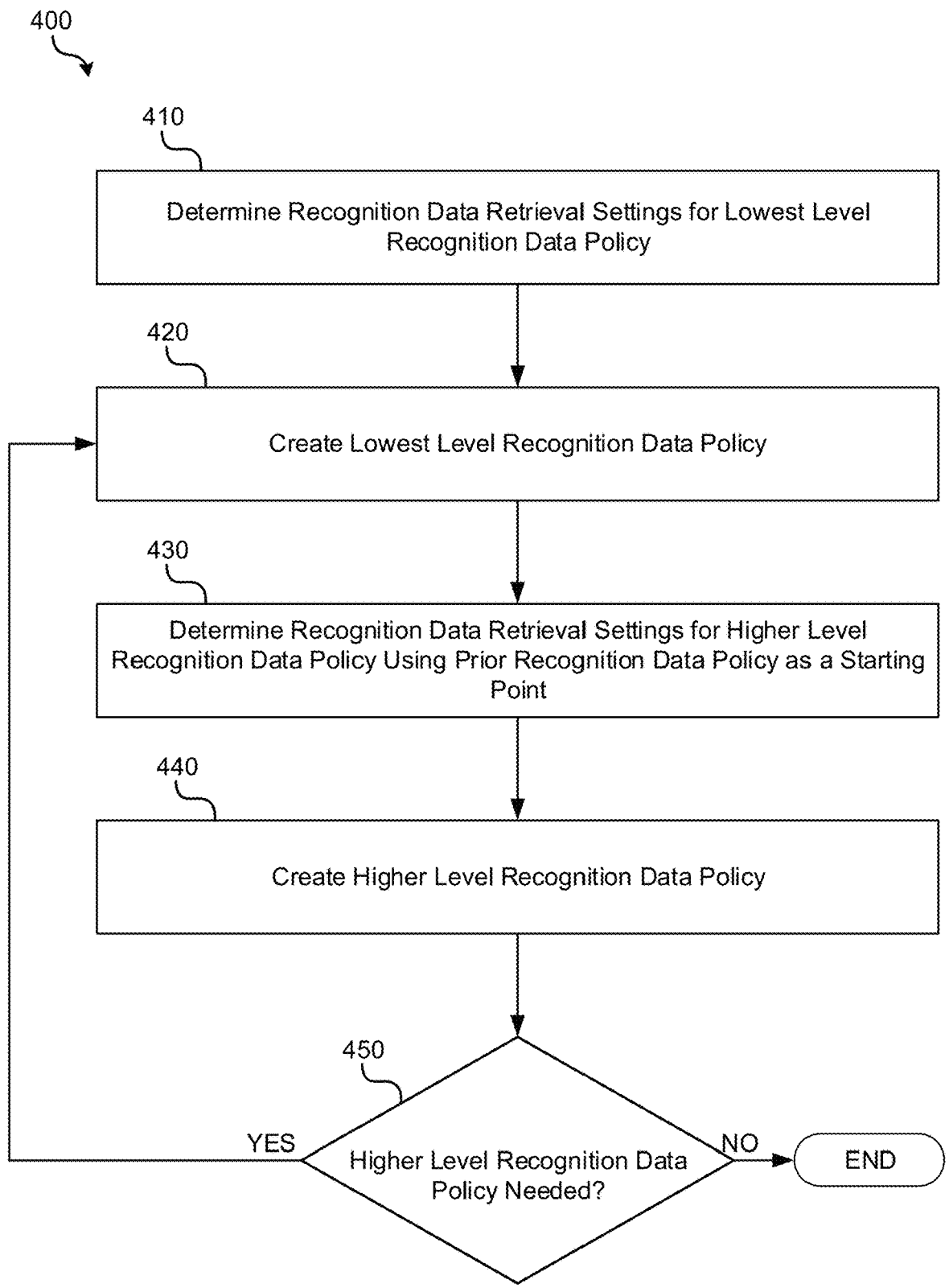
FIG. 4 is an operational flow diagram illustrating an example method that may be implemented to create a hierarchical set of recognition data policies in accordance with embodiments.

FIG. 4 is an operational flow diagram illustrating an example method 400 that may be implemented to create a hierarchical set of recognition data policies in accordance with embodiments. For example, method 400 may be implemented by a recognition assembly 200 or a device in communication with recognition assembly 200 over a communication network.

At operation 410, recognition data retrieval settings are determined for a lowest level recognition data policy associated with an event. As discussed above, the recognition data retrieval settings may specify the settings of sensor devices retrieving the recognition data, the way the retrieved recognition data is processed by a recognition data retrieval module, the way the retrieved recognition data is encrypted, the way the retrieved recognition data is stored, and/or the duration of time the retrieved recognition data is stored before it is deleted.

For the lowest level of recognition data retrieval, the retrieval settings may be determined based on the lowest number of participants that are expected to attend the event at any moment in time. For example, if a minimum of five participants attend an event at any time, then the retrieval settings may be configured such that a recognition assembly is able to recognize five different participants with sufficient confidence. Additionally, the retrieval settings may be based on the similarity of participants that typically attend the event (e.g., uniqueness in clothing, age, gender, size, etc.) The configuration of recognition data retrieval settings may rely on recognition statistics retrieved from database 120, which may provide an indication of the uniqueness of different recognition features. In some implementations, recognition statistics may be retrieved over a communications network using a network interface 250 (e.g., a network interface controller).

At operation 420, a lowest level recognition data policy is created based on the determined recognition data retrieval settings. The created recognition data policy may be saved as a machine-readable file that is stored in a storage of a recognition assembly 200. The stored recognition data policy file may be interpreted by assembly 200 during operation to set recognition data retrieval settings, including the amount of recognition data that is received, the encryption (if any) that is applied to stored recognition data, and a time limit on stored recognition data.

At operation 430, recognition data retrieval settings are determined for a higher level recognition data policy using the prior recognition data policy as a starting point. For example, if a lowest level recognition data policy is configured such that a recognition assembly creates templates that include five facial points, the higher level recognition data retrieval policy may be configured such that it creates templates having at least five or greater than five facial points. Additionally, the security settings of the higher level recognition data policy may be configured to match or exceed the security settings of the previous, lower level recognition data policy. For example, if a lowest level recognition data policy is configured such that a recognition assembly deletes stored templates after an hour, the higher level retrieval policy may be configured such that it deletes stored templates after an hour or less than an hour.

At operation 440, the higher level recognition data policy is created based on the determined recognition data retrieval settings. The policy may be saved as a machine-readable file that is stored with other policies (e.g., lower level recognition data retrieval policies) in a storage of a recognition assembly 200. In some implementations, all recognition data policies may be saved in the same machine-readable file. At decision 450, it is determined if a higher level recognition data policy is needed. If so, steps 420-440 may be repeated. In implementations, the number of hierarchical recognition data policies and settings of created recognition data policies may be tuned to historical participant flow statistics for the event. For example, if there is a high variance in participant flow at an event over time, a higher number of policies may be created. As another example, the settings of the highest and lowest policy levels may be created based on the maximum and minimum number of participants that have been present at the event in any moment of time.

In some implementations, the created recognition data policies may take into consideration the environment of the event where participants are recognized. For example, in cases where environmental conditions are generally dark, it may be preferable to create a set of recognition data policies centered around infrared sensors that capture different levels of infrared data ranging from soft recognition data (e.g., clothing patterns) to some hard recognition data (e.g., body shape). As another example, in cases where environmental conditions may vary over time (e.g., from light to dark), different sets of hierarchical recognition data policies may be created to be applied to the recognition sensor assemblies depending on the time of day. For example, a "daytime" hierarchical set of recognition data policies may use RGB image sensors to recognize participants while a "nighttime" hierarchical set of recognition data policies may use infrared image sensors to recognize participants.

Following creation of a set of recognition data policies, the policies may be stored locally at a recognition assembly 200 and assigned by a recognition data policy selector 230 for participants recognition such that the lowest policy level needed to recognize and distinguish between participants is assigned.

Figure 5:
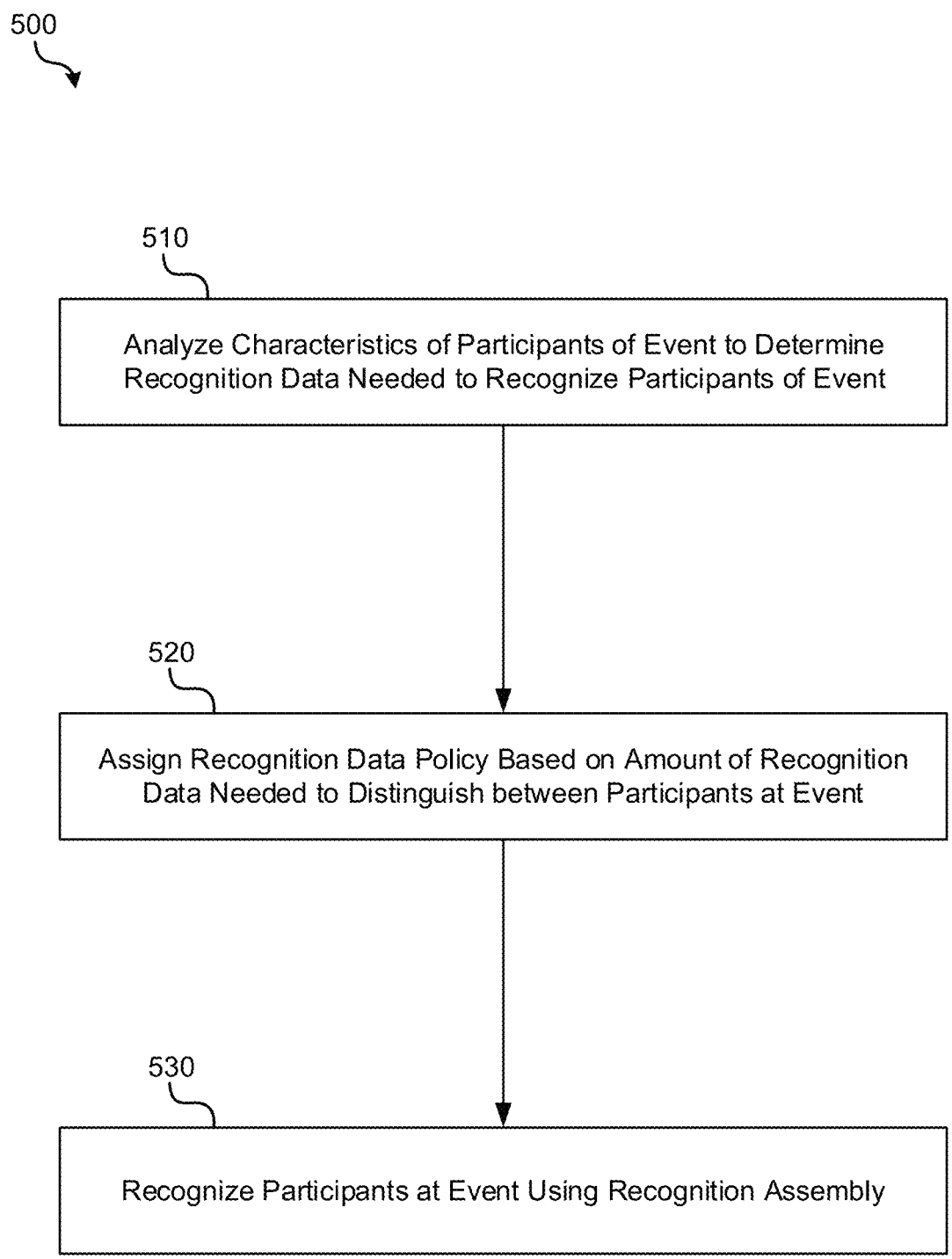
FIG. 5 is an operational flow diagram illustrating an example method that may be implemented at an event to minimize the amount of retrieved recognition data based on the needs of the event.

FIG. 5 is an operational flow diagram illustrating an example method 500 that may be implemented at an event to minimize the amount of retrieved recognition data based on the needs of the event. For example, method 500 may be implemented using one or more recognition assemblies and/or computing modules communicatively coupled to the recognition assemblies.

At operation 510, characteristics of participants of the event are analyzed to determine the amount of recognition data needed to recognize participants of the event. For example, the amount of recognition data needed to recognize individual participants with a threshold confidence level (e.g., 95%, 99%, or higher) may be determined.

This determination may be made in advance, before the event, based on historical statistics relating to the event. For example, before the event, a database of event statistics may track participant flow statistics over time (e.g., participants numbers per unit of time for different months, days of week, holidays, etc.) and statistics regarding the uniqueness of participants that attend the event over time (e.g., variance in clothing, age, size, height, gender, etc.).

Additionally, the determination may be dynamically made during the course of the event (e.g., if determination cannot be made in advance) by dynamically acquired data regarding participant flow and participant uniqueness. For example, one or more cameras of recognition assembly 200 may capture video of attending participants that is processed to acquire data regarding participant numbers/flow and participant uniqueness. Based on the acquired data, a score (e.g., similarity score) may be generated that provides an indication of the amount of recognition data needed to recognize participants with a threshold confidence level.

In some implementations, the determination may take into consideration the state of the environment, including weather conditions, lighting conditions, background noise, etc. For example, in cases where image sensors are used to recognize participants, a lesser amount of recognition data may be needed to recognize participants during bright light conditions (e.g., during the day) instead of during low light conditions (e.g., during the night). As another example, in the case where an audio sensor (e.g., a microphone) is used to recognize participants, a lesser amount of recognition data may be needed to recognize participants of a quiet auditorium instead of participants of an outdoor musical festival.

In some implementations, a database of recognition features 120 that maintains statistics or other information regarding recognition features that are not part of the current population may be accessed to determine the relative uniqueness of different recognition features of the participants of the event.

At operation 520, a recognition data policy is assigned to one or more recognition assemblies based on the amount of recognition data needed to distinguish between participants at the event. For example, a calculated similarity score may be matched with a recognition data policy, where each of a set of recognition data policies is associated with a different range of similarity scores. For a given recognition assembly 200, an assigned recognition data policy may configure the operation of sensor device(s) 200 (e.g., using control signals generated by controller 230), the amount of recognition data that is retrieved from sensor data 231 using recognition data retrieval module 221, the encryption algorithm (if any) that is applied to the retrieved recognition data, and the amount of time that retrieved recognition data is stored in a temporary recognition database 240 before it is deleted. In some implementations, a recognition data policy may also specify that certain types of "non-unique" or common recognition data (e.g., recognition data that is only unique in a population of 5 or fewer individuals) may be serialized for longer term storage.

In some implementations, the assigned recognition data policy may also take into consideration the state of the environment in which participants are recognized. By way of example, it may be preferable in a low light environment, with a handful of participants wearing very different clothing patterns, to capture infrared images of the participants' clothing instead of color images using an RGB image sensor.

At operation 530, participants are recognized at the event using the assigned recognition data policy. For example, participants may be recognized for the first time for the purpose of enrollment, further described below, or participants may be recognized for the purpose of recognition, further described below. In implementations, method 500 may be periodically performed during an event (e.g., every few seconds, minutes, hours, etc.) to dynamically adjust the retrieved recognition data as participant flow and participant uniqueness at the event changes.

In some implementations, participants may have the option of opting in to one of multiple different recognition data policy levels (or not opting in at all). In this manner, the amount of recognition data may be balanced with the level of participant personalization provided by an event in accordance with a participant's preferences. For example, in settings where a recognized party of participants are related (e.g., relatives, friends, etc.), the party of participants may collectively choose to opt in to a particular recognition data policy level for an event.

In other example environments, different participants may opt in to different recognition data policy levels (or no recognition data policies) for the same event. In these example environments, a recognition assembly may determine the appropriate recognition data policy level to apply to recognize a particular participant using a variety of policy level recognition means. For instance, in some examples the participants may wear or otherwise carry a visual marker (e.g., a tag colored in the visible light spectrum or infrared light spectrum) encoded with the participant's opted-in recognition data policy level. The encoded recognition data policy level may be captured and decoded using a recognition assembly containing an image sensor. As another example, the participants may carry RFID tags or other devices (e.g., smartphone with installed application) that wirelessly broadcast a participant's opted-in recognition data policy level for a particular event. As yet another example, a participant may carry a wearable (e.g., a band) that may be encoded (e.g., as a barcode) with the participant's opted-in recognition data policy level.

Referring again to FIG. 2, recognition assembly 200 may operate in an enrollment mode or a recognition mode. In an enrollment mode, recognition assembly 200 may recognize participants for the first time. For example, assembly 200 may receive sensor data 231 from devices 210, retrieve a limited amount of recognition data from the sensor data to generate retrieved recognition data 232, and encrypt and store the retrieved recognition data as encrypted recognition data 233 in temporary recognition database 240. The retrieved recognition data may be stored as one or more templates, each template including a limited set of recognition characteristics (e.g., soft recognition data such as clothing color, hairstyle, eye color, etc.) that may be used to distinguish a participant from other participants for the limited purpose of an event. In the context of the disclosure, the enrollment may be temporary, where just enough recognition data is stored, only as long as it is needed for the event.

In a recognition mode, recognition assembly 200 may recognize participants using recognition data previously stored in temporary recognition database 240. Assembly 200 may receive sensor data 231 from devices 210, retrieve a limited amount of recognition data from the sensor data to generate retrieved recognition data 232, and use participant recognition module 223 to compare the retrieved recognition data with recognition data stored in temporary recognition database 240 to find a match for a participant. For example, the data may be compared with each of a plurality of stored templates to generate a similarity score, and the template that generates the highest similarity score may be returned as a match for the retrieved data.

Figure 6:
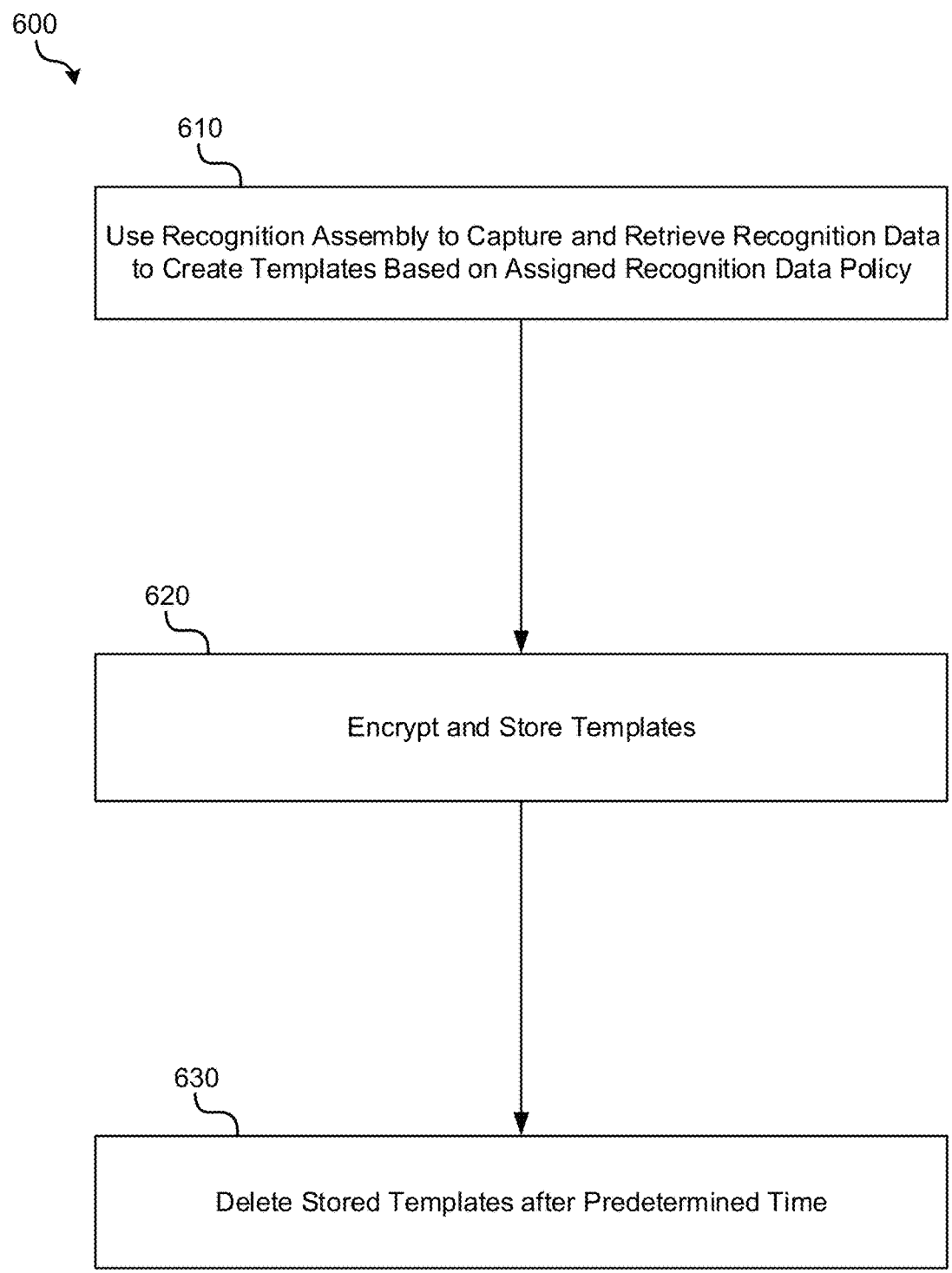
FIG. 6 is an operational flow diagram illustrating an example method of operating a recognition assembly in an enrollment mode using recognition data policies.

FIG. 6 is an operational flow diagram illustrating an example method 600 of operating a recognition assembly 200 in an enrollment mode using recognition data policies. At operation 610, the assembly captures and retrieves recognition data to create templates based on an assigned recognition data policy. The uniqueness of the recognition characteristics included in the template will depend on the assigned recognition data policy. For example, for the lowest level recognition data policy, only soft recognition data or a few facial points may be used to create a template. At operation 620, the templates are encrypted and stored (e.g., in a temporary recognition database 240). At operation 630, the stored templates are deleted after a predetermined amount of time passes.

In implementations, the templates may be stored in a volatile storage that is configured to delete data that has been stored for more than predetermined amount of time. This predetermined amount of time may be based on the needs of the event where recognition is used and may be assigned by recognition data policy. By way of example, consider the case where recognition data is acquired for a convention lasting three days. In this example, a recognition data policy may configure the volatile storage to delete all templates after three days. As another example, consider the case where recognition data is acquired at a restaurant. In this example, a recognition data policy may configure the volatile storage to delete templates that have been stored for more than two or three hours (e.g., typical maximum amount of dining time).

Figure 7:
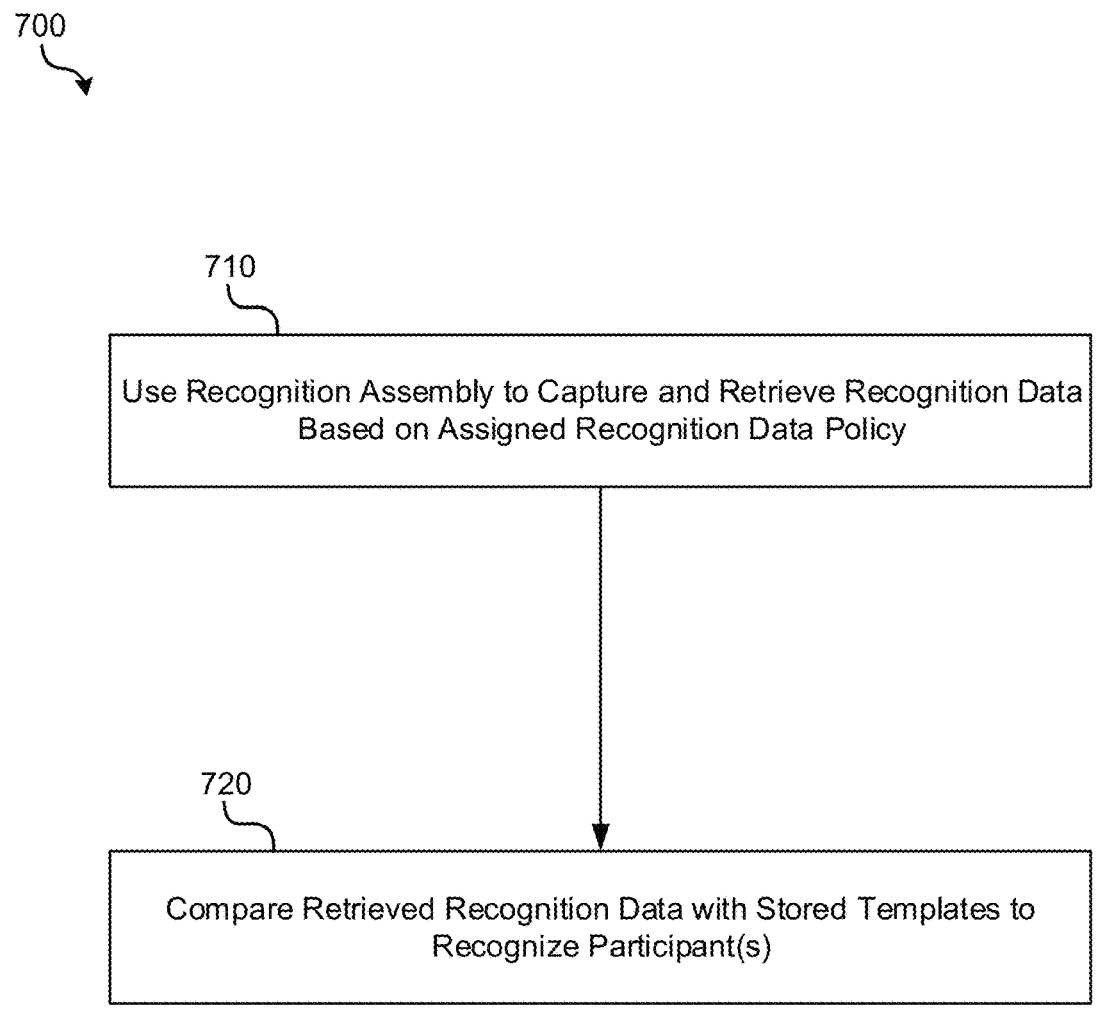
FIG. 7 is an operational flow diagram illustrating an example method of operating a recognition assembly in a recognition mode using recognition data policies.

FIG. 7 is an operational flow diagram illustrating an example method 700 of operating a recognition assembly 200 in a recognition mode using recognition data policies. At operation 710, the assembly captures and retrieves recognition data based on an assigned recognition data policy. At operation 720, the retrieved recognition data is compared with stored templates to recognize a participant. For example, the stored templates may be retrieved from a temporary recognition database 240, and a similarity score may generated for each template based on a comparison of the retrieved recognition data and the template.

Figure 8:
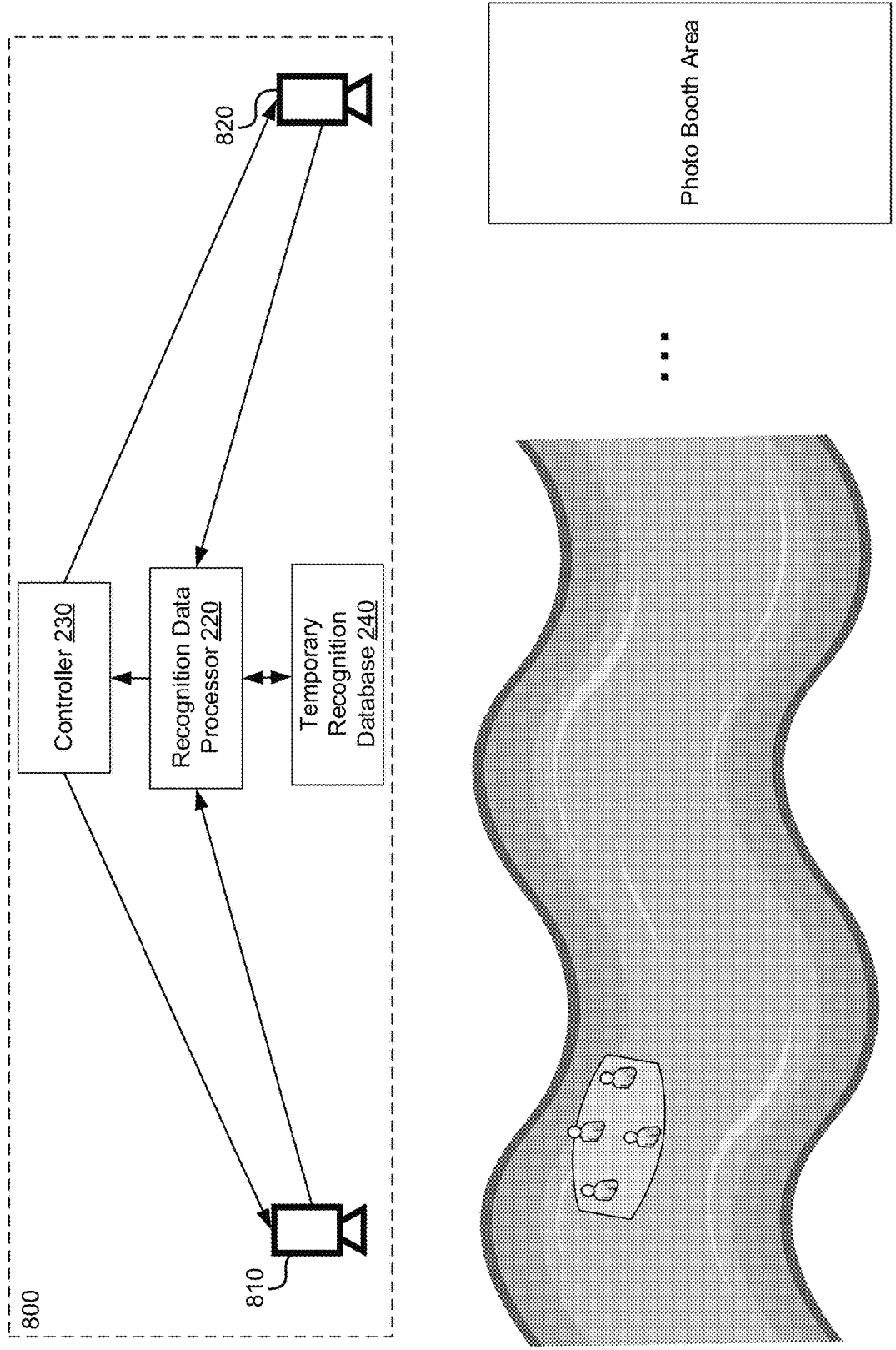
FIG. 8 illustrates an example theme park environment in which the disclosure may implemented.

FIG. 8 illustrates an example theme park environment in which the disclosure may implemented. As illustrated in this example, a recognition assembly 800 may use cameras 810, 820 to retrieve recognition data for participants participating in a water rafting ride. The retrieved recognition data may be used to recognize participants for the purpose of offering a photograph at a photo booth area after the ride is completed. For example, camera 810 may be utilized during an enrollment process to capture participants on the water rafting ride, and camera 820 may be utilized during a recognition process to subsequently recognize the participants to offer the participants a photograph captured during the ride. During operation of the ride, a recognition data policy level may be increased or decreased as lines for the ride increase or decrease.

FIG. 9 illustrates examples show settings 910 and 920 in which different levels of recognition data may be retrieved for the purpose of recognizing audience members during the duration of a show. In setting 910, just enough recognition data is retrieved to distinguish between eight audience members. In setting 920, just enough recognition data is retrieved to distinguish between sixty audience members.

Figure 10:
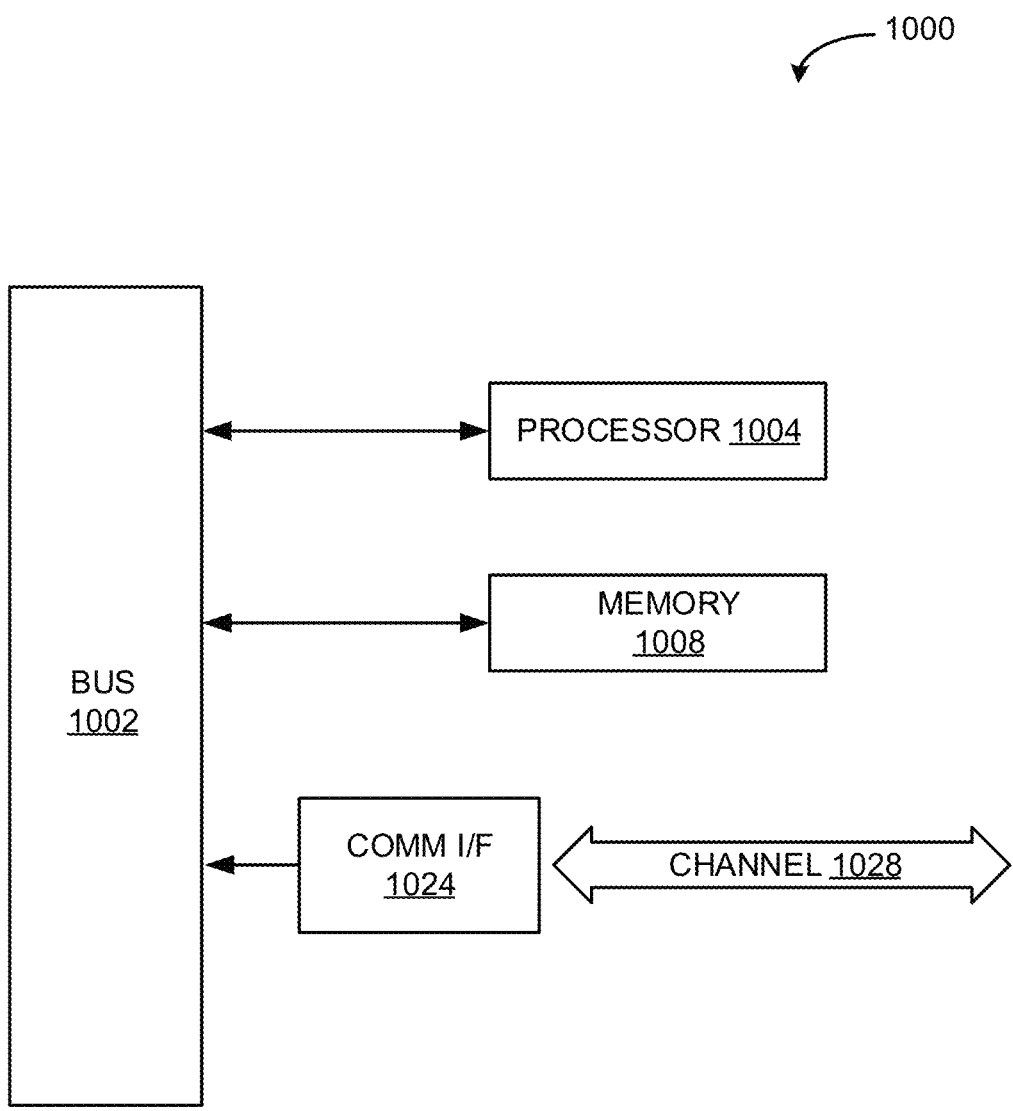
FIG. 10 illustrates an example computing component that may be used to implement various features of the system and methods disclosed herein.

FIG. 10 illustrates an example computing component that may be used to implement various features of the system and methods disclosed herein, such as the aforementioned features and functionality of one or more of recognition assembly 200, recognition data retrieval module 221, recognition data retrieval policy selector 222, participant recognition module 223, encryption module 224 and/or any of their respective component parts.

As used herein, the term module might describe a given unit of functionality that can be performed in accordance with one or more embodiments of the present application. A module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules.

Where modules of the application are implemented in whole or in part using software, in one embodiment, these software elements can be implemented to operate with a computing or processing module capable of carrying out the functionality described with respect thereto. One such example computing module is shown in FIG. 10. Computing module 1000 might include, for example, one or more processors, controllers, control modules, or other processing devices, such as a processor 1004. In the illustrated example, processor 1004 is connected to a bus 1002, although any communication medium can be used to facilitate interaction with other modules of computing module 1000.

Computing module 1000 might also include one or more memory modules, e.g., memory 1008. For example, random access memory (RAM) or other dynamic memory, might be used for storing information and instructions to be executed by processor 1004. Computing module 1000 might likewise include a read only memory ("ROM") or other static storage device coupled to bus 1002 for storing static information and instructions for processor 1004. Memory 1008, or a portion thereof may also be used to store information, and may include a drive or other mechanism to support storage media, such as a solid state drive, an optical disc drive, etc.

Computing module 1000 might also include a communications interface 1010. Communications interface 1010 might be used to allow software and data to be transferred between computing module 1000 and external devices. Examples of communications interface 1010 might include a modem or softmodem, a network interface (such as an Ethernet, network interface card, WiMedia, IEEE 802.XX or other interface), a communications port (such as for example, a USB port, a Thunderbolt port, IR port, RS232 port Bluetooth® interface, or other port), or other communications interface. Software and data transferred via communications interface 1010 might typically be carried on signals, which can be electronic, electromagnetic (which includes optical) or other signals capable of being exchanged by a given communications interface 1010. These signals might be provided to communications interface 1010 via a channel 1012. This channel 1012 might carry signals and might be implemented using a wired or wireless communication medium.

In this document, the terms "computer program medium" and "computer usable medium" are used to generally refer to non-transitory media. These and other various forms of computer program media or computer usable media may be involved in carrying one or more instructions to a processing device for execution. Such instructions embodied on the medium, are generally referred to as "computer program code" or a "computer program product." When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. One or more non-transitory computer-readable mediums storing instructions that, when executed by one or more processors, causes a system to perform a method for capturing recognition data at variable resolution to preserve privacy of participants present at an event, the method comprising:
  acquiring, using a sensor, data representative of characteristics of the participants present at the event;
  assigning, based on an amount of data needed to distinguish between the participants present at the event with a threshold confidence level while minimizing a uniqueness of retrieved recognition data, a recognition data policy; and
  dynamically adjusting the acquired data to produce recognition data in accordance with the recognition data policy.

2. The one or more non-transitory computer-readable mediums of claim 1, wherein the method further comprises: analyzing the acquired data to determine a uniqueness of features between the participants present at the event.

3. The one or more non-transitory computer-readable mediums of claim 2, wherein the method further comprises: determining, based at least on the uniqueness of features between the participants present at the event, the amount of data needed to distinguish between the participants present at the event with the threshold confidence level.

4. One or more non-transitory computer-readable mediums storing instructions that, when executed by one or more processors, causes a system to perform a method for capturing recognition data at variable resolution to preserve privacy of participants present at an event, the method comprising:

acquiring, using a sensor, data representative of characteristics of the participants present at the event;

analyzing the acquired data to determine a uniqueness of features between the participants present at the event;

determining, based at least on a number of the participants present at the event, an amount of data needed to distinguish between the participants present at the event with a threshold confidence level;

assigning, based on the amount of data needed to distinguish between the participants present at the event with the threshold confidence level, a recognition data policy; and dynamically adjusting the acquired data to produce recognition data in accordance with the recognition data policy.

5. The one or more non-transitory computer-readable mediums of claim 2, wherein the method further comprises: determining, based at least on a number of the participants present at the event and the uniqueness of features between the participants present at the event, the amount of data needed to distinguish between the participants present at the event with the threshold confidence level.

6. The one or more non-transitory computer-readable mediums of claim 1, wherein the method further comprises: storing the recognition data in a manner consistent with a security requirement in the recognition data policy.

7. The one or more non-transitory computer-readable mediums of claim 1, wherein the method further comprises: transmitting the recognition data in a manner consistent with a security requirement in the recognition data policy.

8. The one or more non-transitory computer-readable mediums of claim 1, wherein the amount of recognition data produced by dynamically adjusting the acquired data is less than the amount of the acquired data.

9. The one or more non-transitory computer-readable mediums of claim 1, wherein dynamically adjusting the acquired data, comprises: extracting soft recognition data from the acquired data, the soft recognition data including: clothing of the participants, accessories of the participants, or hair color of the participants.

10. The one or more non-transitory computer-readable mediums of claim 1, wherein the sensor is a video camera, wherein dynamically adjusting the acquired data, comprises: lowering a video resolution of the video camera.

11. The one or more non-transitory computer-readable mediums of claim 1, wherein the method further comprises: while the event is in progress, further dynamically adjusting the acquired data based on a changed environmental condition at the event.

12. The one or more non-transitory computer-readable mediums of claim 1, wherein the method further comprises: while the event is in progress, further dynamically adjusting the acquired data based on a changed uniqueness of features of participants present at the event.

13. A method for capturing recognition data at variable resolution to preserve privacy of participants present at an event, the method comprising:

acquiring, using a sensor, data representative of characteristics of the participants present at the event;

assigning, based on an amount of data needed to distinguish between the participants present at the event with a threshold confidence level while minimizing a uniqueness of retrieved recognition data, a recognition data policy; and dynamically adjusting the acquired data to produce recognition data in accordance with the recognition data policy.

14. The method of claim 13, further comprising: analyzing the acquired data to determine a uniqueness of features between the participants present at the event.

15. The method of claim 14 further comprising: determining, based at least on the uniqueness of features between the participants present at the event, the amount of data needed to distinguish between the participants present at the event with the threshold confidence level.

16. The method of claim 13, further comprising: storing and transmitting the recognition data in a manner consistent with one or more security requirements in the recognition data policy.

17. The method of claim 13, wherein the amount of recognition data produced by dynamically adjusting the acquired data is less than the amount of the acquired data.

18. The method of claim 13, wherein dynamically adjusting the acquired data, comprises: extracting soft recognition data from the acquired data, the soft recognition data including: clothing of the participants, accessories of the participants, or hair color of the participants.

19. The method of claim 13, further comprising: while the event is in progress, further dynamically adjusting the acquired data based on: a changed environmental condition at the event; or a changed uniqueness of features of participants present at the event.

20. A system configured to perform a method for capturing recognition data at variable resolution to preserve privacy of participants present at an event, the system comprising:

a sensor configured to acquire data representative of characteristics of the participants present at the event; and a processor configured to:

assign, based on an amount of data needed to distinguish between the participants present at the event with a threshold confidence level while minimizing a uniqueness of retrieved recognition data, a recognition data policy; and dynamically adjust the acquired data to produce recognition data in accordance with the recognition data policy.

* * * * *